United States Patent [19]
Niedner et al.

[11] 4,098,464
[45] Jul. 4, 1978

[54] METHOD OF TREATING REFUSE FOR RECLAMATION OF VALUABLE COMPONENTS THEREOF

[75] Inventors: Peter Niedner; Klaus Hillekamp, both of Munich; Hubert Kindler, Grobenzell, all of Germany

[73] Assignee: Krauss-Maffei Aktiengesellschaft, Munich, Germany

[21] Appl. No.: 810,286

[22] Filed: Jun. 27, 1977

Related U.S. Application Data

[63] Continuation of Ser. No. 624,777, Oct. 20, 1975, abandoned.

[30] Foreign Application Priority Data

Oct. 18, 1974 [DE] Fed. Rep. of Germany ....... 2449689

[51] Int. Cl.² ............................................. B02C 23/14
[52] U.S. Cl. ...................................... 241/24; 241/29; 241/DIG. 38
[58] Field of Search ................... 241/24, 29, DIG. 38

[56] References Cited

U.S. PATENT DOCUMENTS

| | | | |
|---|---|---|---|
| 3,357,380 | 12/1967 | Siracusa | 241/DIG. 38 |
| 3,396,914 | 8/1968 | Liebman | 241/63 |
| 3,844,491 | 10/1974 | Williams | 241/DIG. 38 |
| 3,848,813 | 11/1974 | Stanczyk et al. | 241/DIG. 38 |
| 3,856,217 | 12/1974 | Brewer | 241/DIG. 38 |
| 3,905,556 | 9/1975 | Drage | 241/DIG. 38 |
| 3,922,975 | 12/1975 | Reese | 241/DIG. 38 |
| 3,925,198 | 12/1975 | Eckhoff et al. | 241/DIG. 38 |

*Primary Examiner*—Granville Y. Custer, Jr.
*Attorney, Agent, or Firm*—Karl F. Ross

[57] ABSTRACT

Household or industrial refuse is first passed through a device which rips open garbage bags, breaks open cardboard boxes, and breaks up bundles. Then this refuse is passed through a magnetic separator that extracts all the ferromagnetic elements. Thereafter the refuse is subjected to a coarse comminution and passed through a sieve to eliminate particulate material. The sieved refuse is then fed to an air-classifier which separates it into heavy, medium-heavy, and light fractions. The medium-heavy fraction is more finely communted, then passed through a zig-zag air-classifier and a cyclone to recover material usable in the production of paper, which is combined with the light fraction from the air classifier for reclamation.

2 Claims, 3 Drawing Figures

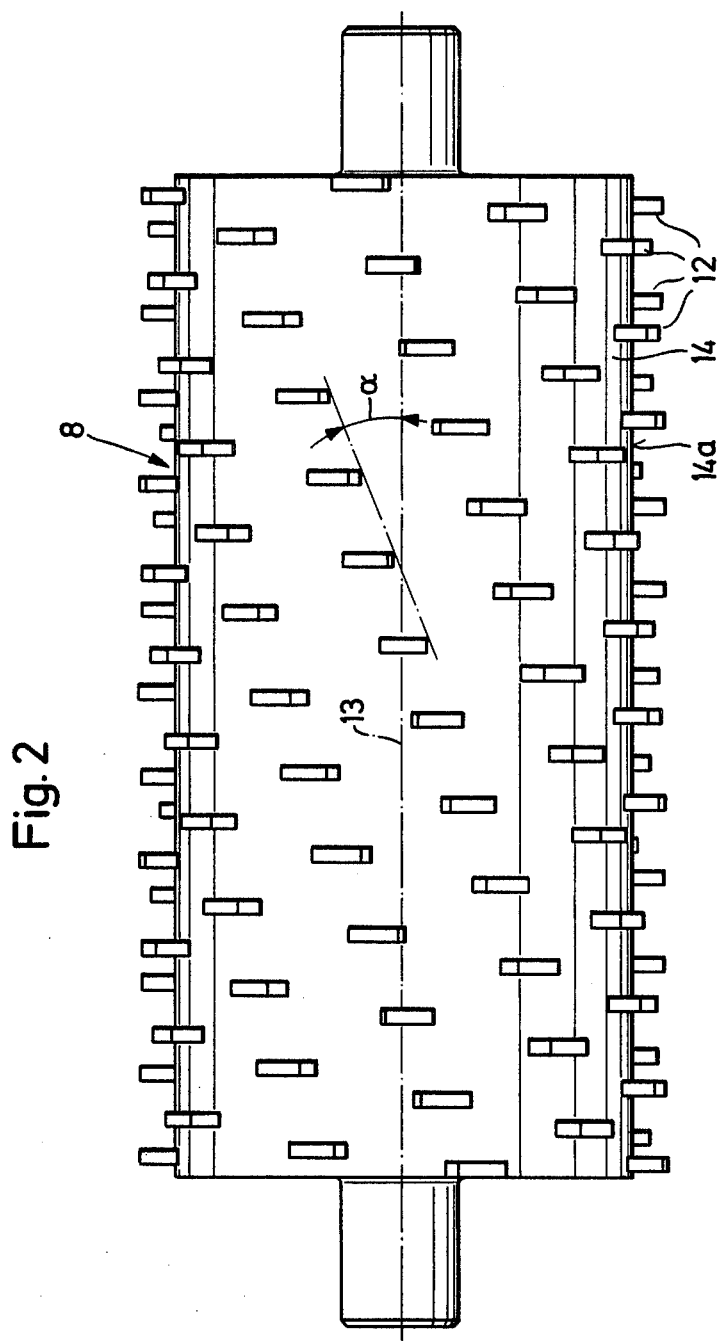

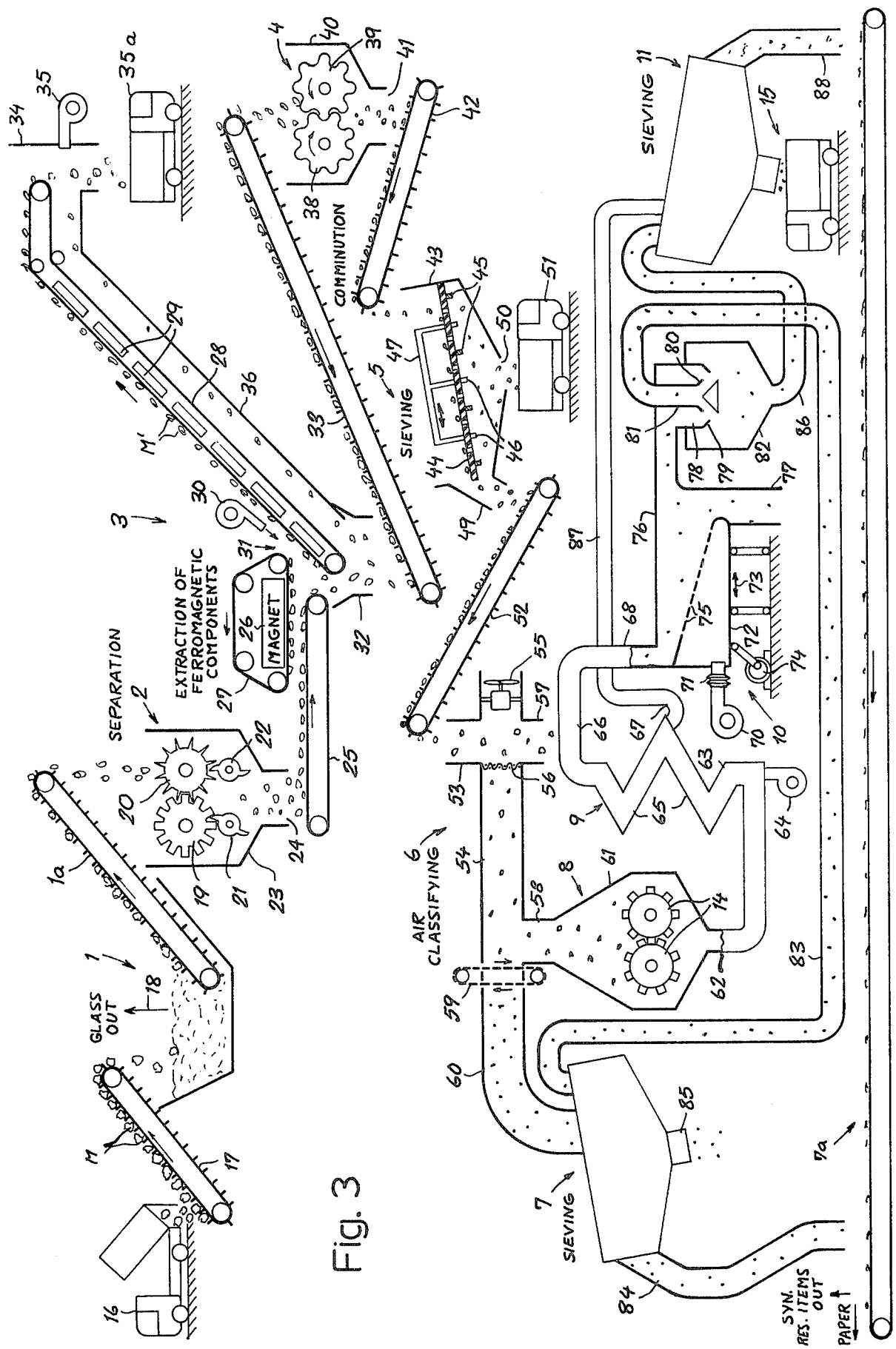

METHOD OF TREATING REFUSE FOR RECLAMATION OF VALUABLE COMPONENTS THEREOF

This is a continuation of application Ser. No. 624,777, filed Oct. 20, 1975, now abandoned.

FIELD OF THE INVENTION

The present invention relates to a method of and system for treating refuse. More particularly this invention concerns a method of and system for treating both industrial and home refuse that allows reclamation of usable components in such refuse.

BACKGROUND OF THE INVENTION

Industrial and home refuse or garbage typically comprises several components or fractions which are worth reclaiming. In particular glass, ferrous and nonferrous metals, and paper and textile components are sufficiently valuable to justify their separation from the refuse. Systems proposed for such sorting typically use a hammer mill wherein the refuse is comminuted and reduced to chunks often no greater than 5 cm in any direction. The thus-comminuted refuse is then sorted by means of an immersion classifier having a body of water into which the comminuted refuse is dumped so that the heavier components — glass, stone, metal — sink and the lighter components — paper, textiles, wood — float. It is also known to use a so-called toss classifier which projects the comminuted refuse through the air with the heavier components being thrown further than the ligher components.

Such an arrangement has the considerable disadvantage that some of the potentially usable components of the refuse are so badly damaged by the comminution operation that their reclamation is not worthwhile. This is particularly the case for paper articles, as the paper is so shredded and saturated as to be virtually worthless. Furthermore many of the heavy constituents are often incompatible with each other, as much organic refuse is of a density comparable with desirable nonferrous constituents in the refuse.

OBJECTS OF THE INVENTION

It is therefore an object of the present invention to provide an improved method of and system for treating refuse.

Yet another object is the provision of an improved treatment method that allows household and industrial refuse to be sorted and valuable constituents thereof to be recovered, in particular recyclable textile and paper constituents.

A further object is the provision of such a method which sorts the refuse in a manner most conducive to reclamation and recycling of its various components.

SUMMARY OF THE INVENTION

These objects are attained according to the present invention in a method of treating refuse comprising the steps of magnetically extracting ferromagnetic components from the refuse, thereafter coarsely comminuting the remaining refuse without destroying the basic characteristics of the components thereof, and thereafter air classifying the remaining refuse into two fractions according to weight and aerodynamic resistance. It has been found that with the method according to the present invention the separation of the ferromagnetic components from the refuse in itself tends to separate the various components of the refuse so that the subsequent coarse comminution of the refuse can be carried out without damage to the comminuting equipment. Various constituents of the refuse, in particular the normally destroyed paper constituents, are therefore left substantially in their original form so that reclamation and recycling of them is very easy. In most known systems the refuse is comminuted finely right at the beginning of the process so that vegetable matter and the like is often mixed with relatively clean refuse, contaminating the entire mass and making further separation of the components very difficult. This is particularly the case when a hammer mill or the like is used to comminute the refuse.

Air classification allows the refuse to be separated into several fractions in one single step. The lightest fraction typically comprises mainly loose paper in sheet form, synthetic-resin foils, and light textiles. A medium-heavy fraction is produced which is comprised mainly of cardboard, heavier synthetic-resin articles, heavy fabrics, and wadded paper. The heavy fraction is comprised mainly of pieces of wood, stones, books, and paper bundles. It is noted that the normally very heavy ferromagnetic elements in the refuse are removed right at the start magnetically. The light fraction is eminently usable for the production of paper. No other known reclamation system is able to recover from normal refuse such a high percentage of usable paper.

In accordance with another feature of this invention the refuse is subjected to an initial ripping or tearing step which does not serve to comminute the refuse, but merely to break up wrapped bundles, rip open garbage bags, break open cartons filled with garbage, and the like. Such a ripping or tearing step greatly facilitates the subsequent sorting and classification.

According to yet another feature of this invention the refuse is sieved before it is air classified. This eliminates from the refuse small particles of vegetable matter, sand, ashes, dust, dirt, and the like which otherwise would find their way into the light fraction produced at the air classifier. Furthermore the refuse is separated as it is transported from step to step in the processing plant so as to dry it out.

In accordance with yet another feature of the present invention the above-mentioned coarse comminution of the refuse is carried out by means of a cutter or chopper. Such device functions in such a manner as to reduce the maximum width and thickness of any element of the refuse to between 200 and 300 mm, whereas in the direction of length the refuse is not reduced at all. This method produces elongated chunks or large pieces of refuse, which are relatively easy to displace downstream. The medium-heavy fraction produced in the air classifier, after separating and/or comminution and/or sifting, is subjected to a second air-classification step. In this step the airstream used to classify the refuse is directed vertically rather than horizontally as in the original air-classification step. Thus two fractions are produced, with the light fraction being lifted upwardly by the rising stream of air and the heavier fraction falling. A so-called zigzag classifier having a plurality of separation stages is used. The light fraction is then centrifugally recovered, for instance by use of a cyclone. The heavy fraction obtained in such a zigzag classifier is subsequently sifted so as to recover from it the still fiber-rich fraction which is highly useful in the production of paper or textiles.

BRIEF DESCRIPTION OF THE DRAWING

The above and other objects, features, and advantages of the invention will become more readily apparent from the following description, reference being made to the accompanying drawing in which:

FIG. 2 is a view of an element of an apparatus used for carrying out the method of FIG. 1, and FIG. 3 is a schematic flow diagram illustrating the system for carrying out the method of FIG. 1.

SPECIFIC DESCRIPTION

Figure 1:
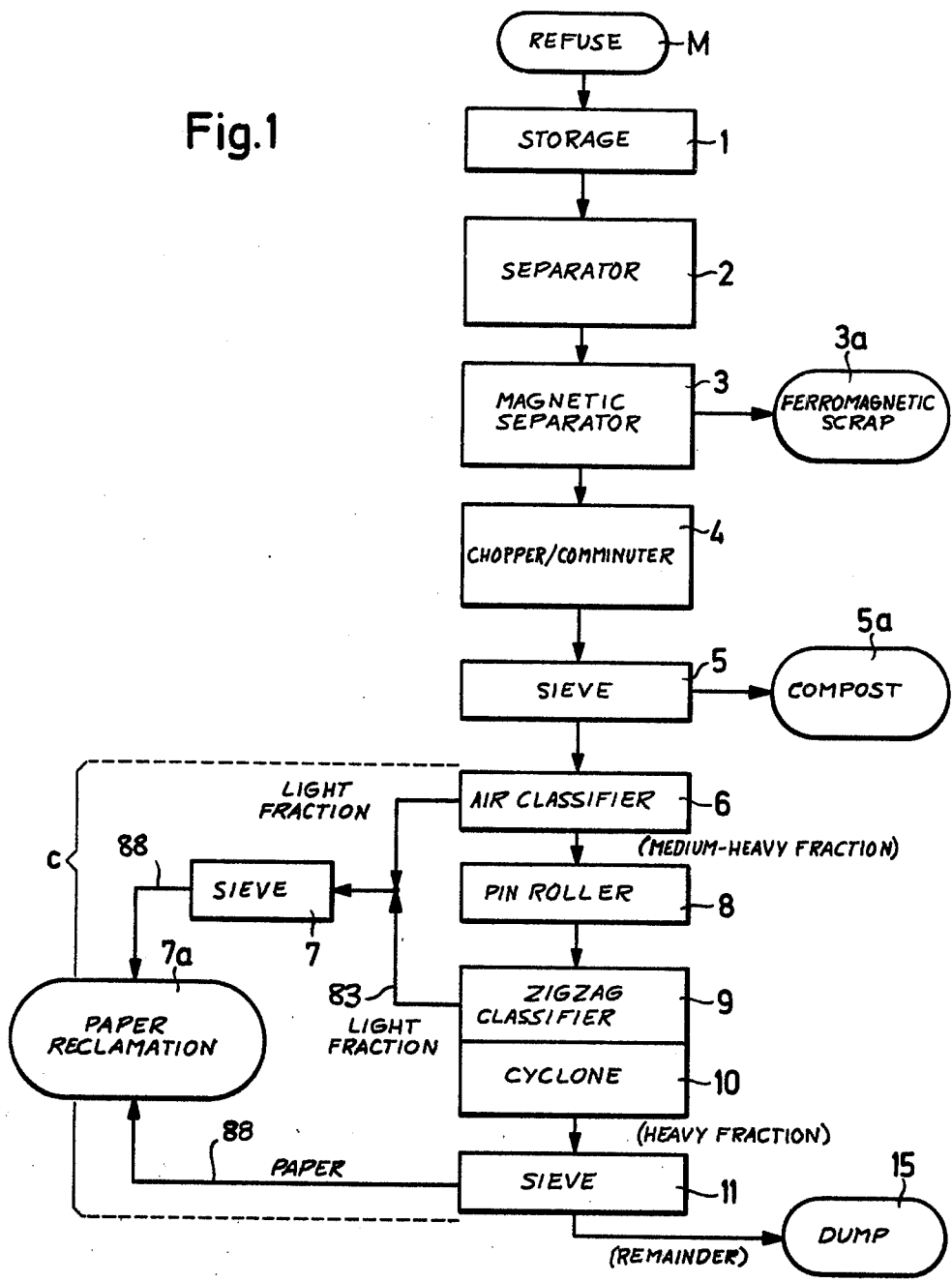
FIG. 1 is a block diagramm illustrating the method according to the present invention.

With reference to FIGS. 1 and 3, the system according to the present operation operates on industrial and household trash M delivered by trucks 16 to a loading conveyor 17 that drops the refuse into a storage area 1. Glass constituents of the unbagged garbage are then removed as much as possible as indicated by arrow 18, an operation best carried out by hand.

From the area 1 a conveyor 1a drops the largely glass-free refuse M into the top of a separator 2 such as is described in German Auslegeschrift Pat. No. 507,485 corresponding to U.S. Pat. No. 3,396,914 issued Aug. 13, 1968. This separator 2 has a pair of main rotors 19 and 20 and a pair of secondary rotors 21 and 22 confined in a housing 23 having an outlet 24 opening above another conveyor belt 25. The separator 2 merely serves to break open cardboard boxes, rip open garbage bags, and otherwise insure that the various components of the refuse are separated.

Downstream of the separator 2 there is provided a magnetic separator 3 such as described in German Offenlegungsschrift No. 1,957,636. This apparatus 3 has a magnet 26 suspended over a belt 27 extending parallel to and slightly above the belt 25. Thus ferromagnetic components of the refuse carried on the belt 25 are attracted upwardly and caught on the belt 27 which transports them downstream where they are dropped onto a rising belt 28 riding above magnets 29 which adhere the magnetic elements M' to this belt 28. A blower 30 directed downwardly at the gap 31 between the two belts 27 and 28 blows nonmagnetic particles off the belt 28 down into an outlet chute 32 above a transport belt 33. The upstream end of the belt 28 opens into a downwardly open chute 34 across the bottom of which is horizontally directed a blast of air from a blower 35 so as to drive light nonferrous parts of the dropping refuse into another chute 36 that terminates in the outlet hole 32. The ferrous elements M' which get past the blast of air from the blower 35 fall into a truck 35a (FIG. 3). Reclamation and reuse of such ferromagnetic scrap is thereafter a simple matter. Recovery of the scrap is represented at 3a in FIG. 1.

From the horizontal transport belt 33 below the outlet opening 32 the refuse which by now free of that portion of the glass removed by hand and ferromagnetic elements is dropped into a coarse comminuter 4 such as produced by the Schmalbach-Lubeca-Werke AG of Braunschweig, West Germany under the trade name UNIGREX U-20. This apparatus has a pair of bladed meshing rollers 38 and 39 rotatable in opposite directions in a housing 40. These rollers act as cutters and serve to reduce the refuse to elements whose width and thickness are between 200 and 300 mm but which can have any length. Such a device has considerable capacity and can, for example, reduce between 100 and 150 truck tires to chunks in an hour.

The coarsely comminuted refuse issuing from the outlet 41 of the coarse comminuter 4 falls onto a rising transport belt 42 which drops it into the top of a sieve 5 of the type produced by Liwell Co. of West Germany and having a housing 43 across which horizontally extends a perforated elastomeric mat 44. Supported on transverse horizontal beams 45 and displaceable beams 46 carried on a frame 47. The entire housing 43 is tipped toward a downstream end 49 and has a lower outlet opening 50. Particulate constituents of the refuse drop out of the outlet opening 50 into a truck 51 so that the refuse issuing from the outlet 49 of the sieve 5 is substantially free of small organic material, sand, dust, ashes and the like. The recovered material, carried away by truck, can be composted as shown at 5a in FIG. 1.

The particle-free refuse is carried upwardly by a conveyor 52 that drops it into the top chute 53 of an air-classifier 6 such as described in French Pat. No. 760,325. Such an air-classifier has a horizontal passage 54 at the upstream end of which is provided an intake fan 55 that drives a current of air transverse to the incoming refuse. A screen 56 provided immediately downstream of a downwardly opening outlet 57 permits a heavy fraction to drop out of the outlet opening 57. The remainder passes through the opening in the screen and is entrained by the air current. A medium heavy fraction is separated at a second outlet 58 arranged immediately upstream of a downwardly displaced screen belt 59. The lightest fraction passes through this screen belt 59 into a passage 60.

The medium-heavy fraction from the outlet 58 drops into a pin-roller comminuter 8 having a housing 61 in which are provided a pair of cylindrical rollers 14 such as shown in FIG. 2 and provided with rectangular-section radially extending pins 12. These pins 12 are arranged in rows lying at an angle of less than 45°, here 25°, to a line 13 lying parallel to the rotation axis of the roller 12 on the surface 14a thereof. This pin-roller arrangement 8 therefore rips apart and further comminutes the medium-heavy fraction from the outlet 58.

The further comminuted fraction is fed out of the outlet 62 of the pin-type arrangement 8 and to the lower input end 63 of a zig-zag classifier 9 such as described in German Pat. Nos. 1,270,380, 1,482,424 and 1,507,684 (U.S. Pat. No. 3,396,914). Such a zig-zag classifier has a blower 64 at its lower end which directs a current of air upwardly through a succession of oppositely inclined stages 65. The lightest fraction issues from the upper outlet end 66 of the classifier 9 and the heavier fraction issues from a lateral opening 67.

The lighter fraction coming from the upper outlet 66 passes through a pipe 68 into a cyclone-type separator 10 such as described in Danish Pat. No. 96,330. This cyclone arrangement 10 has a blower 70 connected via flexible couplings 71 to a hollow displaceable unit 72 oscillated back and forth as shown by arrow 73 by means of a motor 74 and formed in its upper wall with openings 75 so that air issues therefrom and forces the lighter constituents of the fraction issuing from the top of the zig-zag classifier 9 upwardly into a pipe 76, with the heavier pieces dropping outwardly from an outlet 77. The upper end of the pipe 76 opens tangentially into an annular chamber 78 having a downwardly converging lower edge 79 slightly below the downwardly diverging lower edge 80 of a pipe 81 extending upwardly coaxially through the center of the chamber 78. A receptacle 82 surrounds the lower ends of the chamber 78 and pipe 81 so as to catch the heavier fraction entering it, with the lighter fraction rising through the outlet pipe 81 and thence through a pipe 83 to another sieve 7 to which a lighter fraction in the passage 60 from the air-classifier 6 is also fed.

In this sieve 7 which is identical in construction to the sieve 5, again the refuse is separated into two fractions, with the lighter fraction issuing at 84 and being dropped onto a conveyor belt 7a. The heavier fraction issues at 85.

The heavier fraction from the cyclone-arrangement 10 is fed from the bottom of the container 82 via a pipe 86 to another sieve 11 along with the heavier fraction issuing from the outlet 67 and passing through a pipe 87 from the zig-zag classifier 9. This sieve 11 is also identical to the sieve 5 and takes a lighter fiber fraction from the refuse which it deposits via a pipe 88 onto the belt 7a. The heavier fraction drops out at 15 and can be discarded or further exploited. It is noted that the material issuing at 50, 85, 77 and 15 can all be combined. Since this material is of relatively heavy density it can be used for the manufacture of building blocks or as inexpensive fill.

We claim:

1. A method of treating bulk municipal waste collected at least in part in the form of bundles, boxes and bags, which comprises the steps of:
    (a) removing glass articles from the collected municipal waste;
    (b) breaking up bundles and boxes and ripping open bags in the refuse to produce a bulk product;
    (c) magnetically extracting ferromagnetic articles from said bulk product;
    (d) coarsely comminuting the refuse remaining after step (c) without destroying the basic characteristics of the components thereof by cutting large pieces of refuse into smaller pieces having generally widths and thicknesses up to 300 mm but substantially unreduced lengths;
    (e) air classifying the coarsely comminuted refuse from step (d) according to weight and aerodynamic resistance into three fractions, namely
        a light fraction comprised mainly of loose paper in sheet form, synthetic-resin foils and light textiles,
        a medium heavy fraction comprised mainly of cardboard, heavier synthetic-resin articles, heavy fabrics and wadded paper, and
        a heavy fraction comprised mainly of pieces of wood, stones, books and paper bundles, by passing the coarsely comminuted refuse from step (d) through a horizontally directed stream of air;
    (f) recovering from said light fraction of step (e) substantially all synthetic-resin pieces contained therein and separately recovering paper from said light fraction; and
    (g) subjecting said medium heavy fraction to a vertically flowing stream of air along a rising zigzag path to recover paper from said medium heavy fraction and removing the paper from the air stream in a cyclone to recover the paper.

2. The method defined in claim 1, further comprising the step of sifting a fraction consisting principally of fibers from said medium heavy fraction of step (e).